United States Patent [19]

Mace et al.

[11] Patent Number: 4,685,377
[45] Date of Patent: Aug. 11, 1987

[54] MISSILE LAUNCHER WITH EJECTION SHOE

[75] Inventors: Guy Mace, Le Chesnay; Andre Anglard, Rambouillet; Andre Insa, Montlgny, all of France

[73] Assignee: Matra, France

[21] Appl. No.: 831,309

[22] Filed: Feb. 20, 1986

[30] Foreign Application Priority Data

Feb. 22, 1985 [FR] France ............................ 85 02612

[51] Int. Cl.⁴ ........................... B64D 1/02; F41F 3/06
[52] U.S. Cl. ................................... 89/1.54; 89/1.815; 244/137.4
[58] Field of Search ............ 89/1.815, 1.8, 1.54, 89/1.57, 1.51; 244/137 A

[56] References Cited

U.S. PATENT DOCUMENTS

| | | | |
|---|---|---|---|
| 2,481,542 | 9/1949 | Schuyler | 89/1.815 |
| 2,958,260 | 11/1960 | Anderson | 89/1.815 X |
| 3,008,376 | 11/1961 | Brunow et al. | 89/1.54 |
| 3,273,459 | 9/1966 | Lardin | 89/1.54 |
| 3,799,478 | 3/1974 | Costes et al. | 89/1.57 X |
| 3,871,604 | 3/1975 | Coutin | 244/137 A |
| 4,440,365 | 4/1984 | Holtrop | 89/1.54 X |
| 4,600,171 | 7/1986 | Kalisz | 244/137 A |

FOREIGN PATENT DOCUMENTS 1556386 11/1979 United Kingdom .
2078912 1/1982 United Kingdom .

Primary Examiner—David H. Brown
Attorney, Agent, or Firm—Larson and Taylor

[57] ABSTRACT

A missile launcher comprises a supporting structure a bearing shoe connected to a supporting structure by links articulated so as to form a deformable parallelogram. A fluid pressure cylinder releases a locking system securing the missile on the structure and actuates the links in a direction causing the shoe to push the missile away. The shoe has a sufficient length for determining the distance between the missile and the aircraft at the end of its stroke and also the angular position of the missile. With that arrangement, the position and angular speed of the missile when the thrust of the shoe ceases may be accurately determined.

6 Claims, 9 Drawing Figures

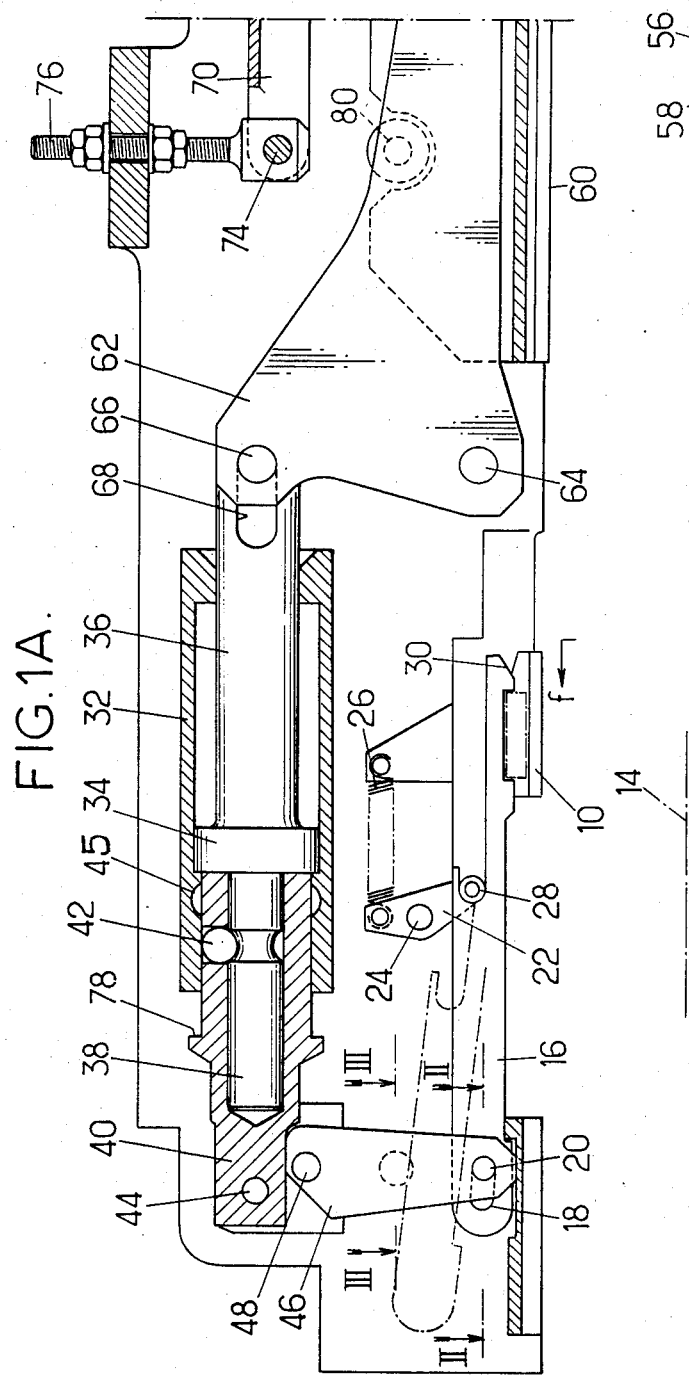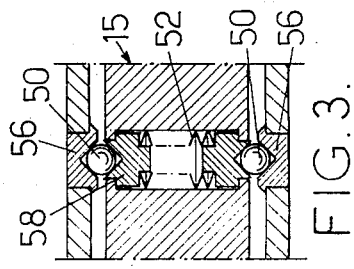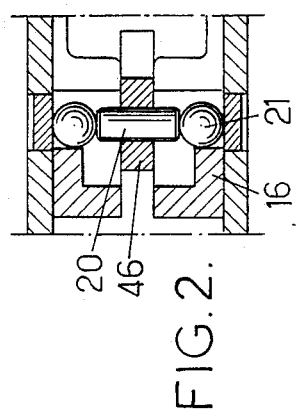

MISSILE LAUNCHER WITH EJECTION SHOE

BACKGROUND AND SUMMARY OF THE INVENTION

The invention relates to a missile launcher for use on a military aircraft, comprising means for moving the missile away from the aircraft before the propulsion unit of the missile is ignited.

Missile launchers are already known comprising two actuating jacks or cylinders whose pistons exert forces which move the missile away from the aircraft when the cylinders are fed from a source of pressurized fluid which may be a liquid or, more frequently, combustion gases, as described for instance in French Specification No. 2,498,747.

By using a missile launcher of this type and igniting the missile propellent once the missile is at a distance from the aircraft, it is possible to house the missile partially within the fuselage, thereby reducing the aerodynamic drag, and/or to mount several missiles in tandem under the fuselage. However, the prior art constructions have a defect which becomes very serious if ignition of the propellent charge takes place a considerable time after ejection: a relative difference as low as 1/100 between the forces exerted by the two cylinders is sufficient to impart to the missile an appreciable angular pitch speed. Since it is extremely difficult to balance the forces exerted by the cylinders with such a degree of accuracy, the attitude of the missile at ignition of the propellant cannot be accurately adjusted.

It is an object of the invention to provide an improved launcher for ejecting a missile. It is a more specific object to provide a launcher which imparts a well defined angular pitch velocity to the missile for the whole ejection range, thus allowing ignition of the propellent unit and operation of the control means to be delayed. It is still another object to provide greater operating safety by mechanically preventing ejection of the missile as long as a prior unlocking operation has not taken place and to increase the degree of error acceptable as to the position of the center of gravity.

According to the invention, there is provided a missile launcher comprising, on a supporting structure: releasable means for securing the missile; a bearing shoe on the missile connected to the supporting structure by links articulated so as to form a deformable quadrilateral, approximately a parallelogram; and fluid pressure controlled means for successively releasing the securing means and actuating the links in a direction causing the shoe to push the missile away, said shoe having a sufficient length for determining not only the distance between the missile and the aircraft but also the angular position of the missile. With this arrangement, the position and angular speed of the missile when the thrust of the shoe ceases may be accurately determined. The angular speed is substantially zero when the links form a deformable parallelogram. On the other hand, a link system having a shape different from a parallelogram may rotate the shoe during its movement, and so the angular pitching ejection speed of the missile can be adjusted. In particular, it is possible to give to the missile a nose down (or tail down) position and a pitching speed so as to move the missile rapidly away from the aircraft and so as to take into account conditions under which firing generally takes place.

The shoe will advantageously be provided with a shape which mates with the shape of the skin of the missile; it may have a length representing at least one sixth of the length of the missile and be placed so as to exert its action on the missile in the zone of the center of gravity thereof. However, a missile launcher according to the invention may tolerate appreciable variations in so far as the dimensions, mass an position of the center of gravity are concerned.

The means for securing the missile typically comprises a rail in one or more pieces, along which one or more fittings of the missile are slidably received. Then the missile may be inserted by forwarly moving it until it is longitudinally retained by a locking hook, movable by an actuating cylinder so as to drive the missile forwards and to free the fittings from the rail. In a first embodiment, the unlocking cylinder comprises a movable assembly which, during a first part of its path from a rest position, causes disengagement of the missile and, during a second part, causes ejection by actuation of the shoe. In another embodiment, the fluid pressure means comprise a first cylinder for unlocking and a second cylinder which controls the movement of the shoe, the two cylinders being associated by fluid transfer means arranged so that the second cylinder can only be actuated after the first has caused unlocking.

The invention will be better understood from the following description of particular embodiments given by ways of examples.

SHORT DESCRIPTION OF THE DRAWINGS

FIGS. 1A and 1B are diagrams, in elevation, of the front and rear parts of a first embodiment of a missile launcher;

FIGS. 2 and 3 are sectional views through lines II—II and III—III of FIG. 1A,

Figure 1B:
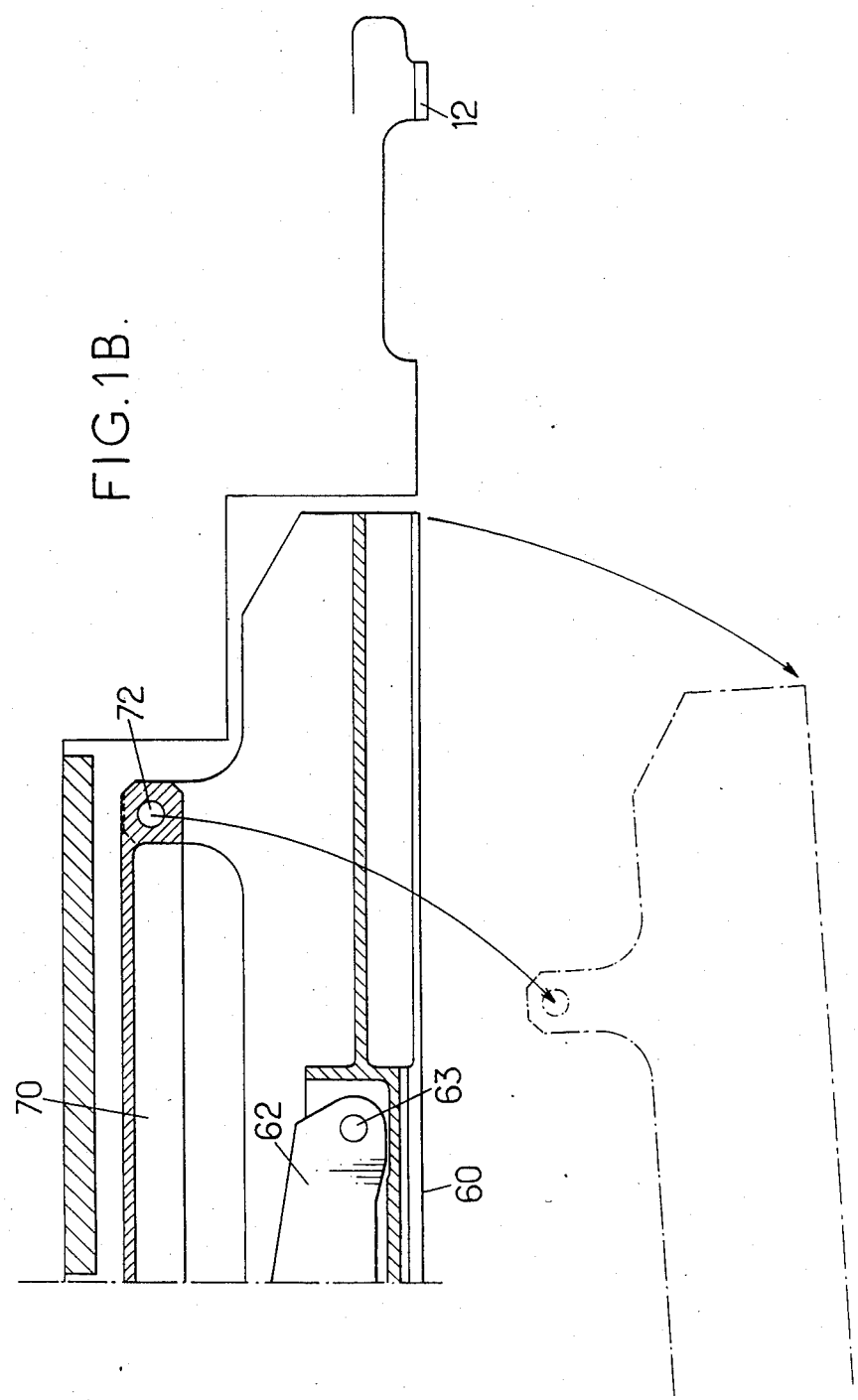
Figure 4:
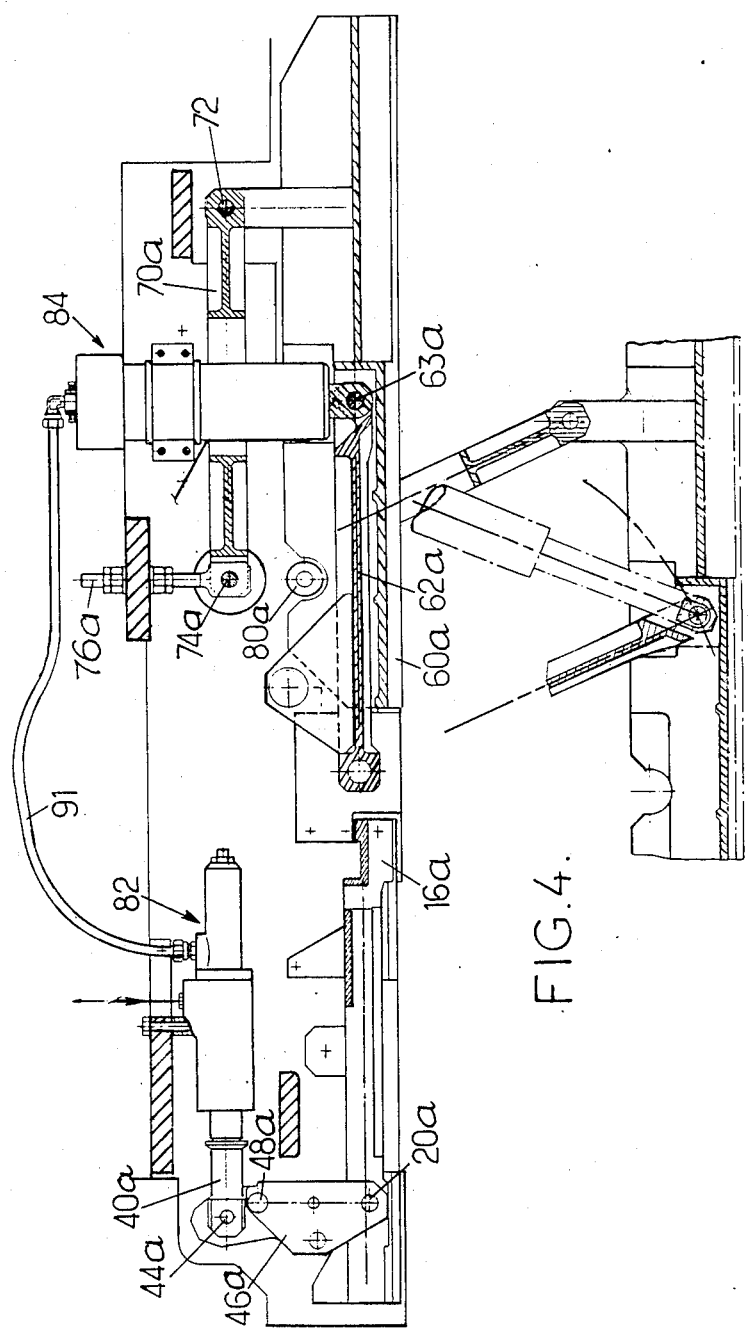

FIG. 4, similar to FIGS. 1A, and 1B, shows a second embodiment; and

Figure 5:
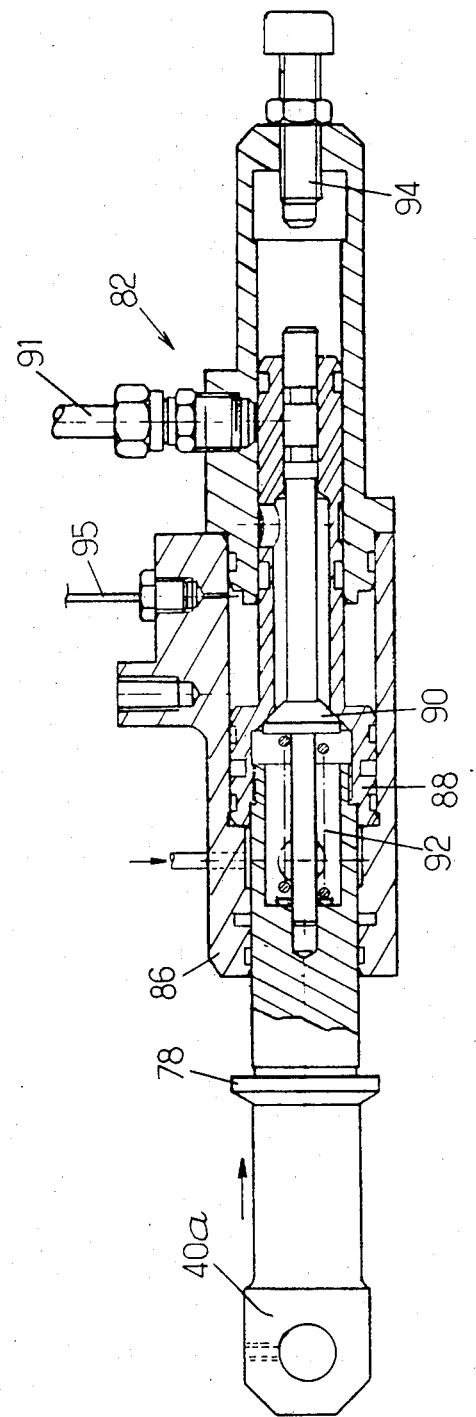
Figure 6:
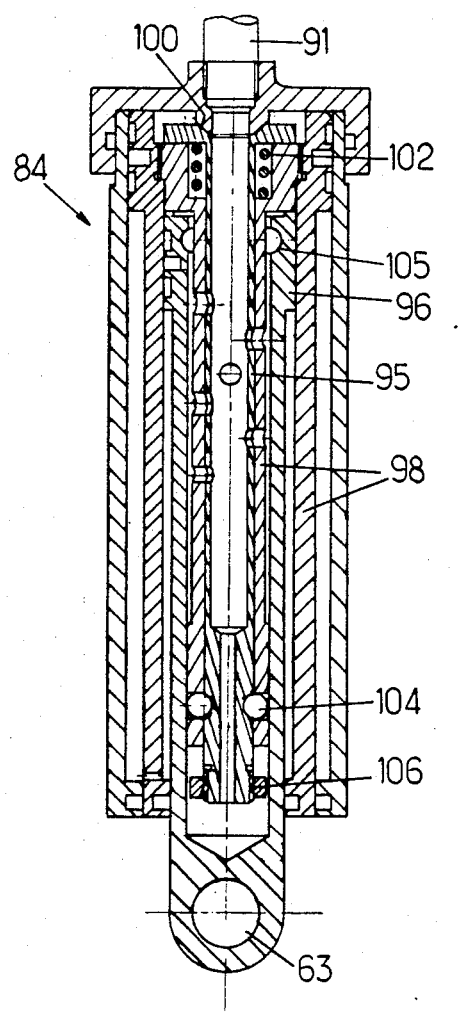

FIGS. 5 and 6 are enlarged views of the actuating cylinders of the device of FIG. 4.

DETAILED DESCRIPTION OF PREFERRED EMBODIMENTS

Referring to FIGS. 1A and 1B, a missile launcher comprises a partially illustrated supporting structure arranged for being secured to the framework of a carrier aircraft. The support structure comprises a supporting rail having two sections 10 and 12 for receiving front and rear fittings of the missile; the axis 14 of the missile is shown in the position assumed during transport. The fittings are arranged for being engaged onto the rail sections 10 and 12 from the rear, in the directions shown by arrow f.

The releasable means for longitudinally retaining the missile on the structure comprise a locking catch 16 arranged to be moved within the supporting structure between a locking position in which it is shown with a continuous line in FIGS. 1A and 1B and a position in which it releases the missile (in broken line). An elongate opening 18 formed in the front part of the catch 16 accomodates a pivotal and drive pin 20. The other end of catch 16 is biased downwards by a crank 22 rotatably received on the structure about pin 24 and which is provided with a return spring 26. When crank 22 and catch 16 are in their rest position, an end roller 28 of the crank engages in a notch of the catch 16. The catch has an end portion constituting a bolt comprising a slanting ramp portion 30 so that the bolt is lifted while the catch rotates about pin 20 against the force of spring 26 when the missile is introduced and then snaps back and locks the front fitting of the missile.

For manual removal of the missile, crank 22 may be provided with an external lever for rotating it against the biasing force of spring 26 and lifting catch 16 to release the missile which may then be withdrawn rearwardly.

As shown in FIGS. 1A and 1B, the launcher comprises fluid pressure means formed by a single cylinder placed substantially parallel to the axis of the missile, for successively causing:

as a first step, unlocking of catch 16,
as a second step, release of the missile by pulling the front fitting of the missile forwards by means of catch 16,
as a third step, actuation of the ejection shoe.

Due to the user of a single actuating cylinder, the system is reliable in operation since ejection may take place only after release of the missile.

As will be seen further on, the cylinder may be provided for exerting a much smaller force during the first two steps than during the third step.

The cylinder has a body or casing 32 pivotally connected to the support structure and a composite mobile unit movable along the casing. That unit comprises a piston 34 fast with a rear rod 36 connected to a linkage for actuating the ejection shoe and a front rod 38. Rod 38 is slidably mounted in a socket or sleeve 40. A system for temporarily locking rod 38 in socket 40 comprises rollers or balls 42 housed in radial grooves in socket 40 and which, when they are retained by the wall of casing 32 in such a position that they project inwardly out of the grooves, protrude into a groove in rod 38 and retain it with respect to the socket. A groove 45 formed in the casing allows the balls to spread apart radially and to release rod 38 when the movable unit has travelled a predetermined distance from the rest position in which it is shown in FIGS. 1A and 1B.

Socket 40 is connected by a pivot 44 to a lever 46 rotating about pin 48 carried by the support structure. The end of the lever opposite that which is pivotally received on socket 40 carries the pin 20 on which the catch 16 is pivotally mounted. A device for resilient locking of lever 46 is provided for retaining this lever as long as it is not subjected to a force exceeding a predetermined threshold. As shown in FIG. 3, the resilient locking mechanism comprises a plurality of balls 50 and a stack of resilient washers 52 housed in the lever and which urges the balls against locking seats 56 through pusher plugs 58.

The rod 36 of the cylinder is connected to a linkage for actuating the ejection shoe 60. The lower part of shoe 60 may advantageously have the form of a gutter having a shaping mating that of the skin of the missile. The linkage comprises a main link 62 for transmitting the drive force to shoe 60, which link rotates on a pin 64 carried by the support structure. The rod 36 and link 62 are connected by a pin 66 fixed to link 62 and retained in an elongate hole 68 in rod 36. An auxiliary link 70 is pivotally connected on a pivot 72 to shoe 60 and on a pivot 74 to the support structure. The position of pivot 74 is advantageously adjustable, for example by means of a threaded rod 76 and locking nuts, so that the angular position taken by the shoe during the travel of piston 34 may be adjusted. The quadrilateral formed by pivots 63, 64, 72 and 74 will always be close to a parallelogram, the pitching speeds to be imparted to the missile being always low or zero.

It can be seen that the angular position imparted to the missile when shoe 60 reaches the end of its travel (as shown with dash dot lines in FIG. 1B) only depends on the geometry of the linkage.

Operation of the device on actuation of piston 34 may be considered as comprising three successive steps which will be described successively, these steps taking place sequentially as soon as pressurized gas is fed into the gap between piston 34 and a shoulder of the casing of the cylinder against which the piston bears in rest condition (FIGS. 1A and 1B).

The pressurized fluid source is advantageously a pressurized gas bottle, separated from the cylinder by a lid which is fractured by percussion at the time of actuation. An electromagnetic control valve may be inserted between the pressurized gas bottle and the actuating cylinder.

Step 1: Unlocking

Gas pressure is initially applied only to a small effective area of action, corresponding to the differences between the cross-sections of piston 34 and of the unlocking socket 40. Piston 34 moves, rightwards in FIGS. 1A and 1B, and drives socket 40 and lever 46. The movement only begins when the force exerted on level 46 is sufficient to overcome the force exerted by the resilient washers 52 due to their precompression and to drive back the plugs 58. As soon as lever 46 begins to rotate, it draws pin 20 which, in rest position, retains the two balls 21 which lock catch 16. The length of the elongate hole 18 must be sufficient for unlocking to occur before pin 20 comes into abutment with and exerts a driving force on catch 16.

The locking system formed by the two balls 21 prevents forward movement of the missile except under ejection conditions and more particularly prevents untimely release due to an accidental thrust exerted by the ejection shoe 60.

Step 2: Disengagement of the missile

Once pin 20 is in abutment against the edge of hole 18, continued movement of lever 46 drives catch 16 forwards. The catch draws the missile forwardly and the missile fittings slide along the suspension rail. There is retraction of the umbilical connector (not shown, typically carried by a deformable parallelogram system for retracting as the missile moves forward), actuation of the propellent system and of the self-steering system, and/or spreading of the missile airfoils. A shoulder 78 on socket 40 comes into abutment against casing 32 when the socket has travelled a sufficient distance for moving the fittings of the missile out of the rail. For this same distance, balls 42 comes into a position confronting the groove 45 in the cylinder casing. Catch 16 is then as shown in dash-dot lines in FIGS. 1A and 1B.

Step 3: Ejection

During the last step, piston 34, pushed by the gases, further travels along. The effective area of pressure action is then equal to the whole cross-sectional area of the piston. The elongate hole 68 is shaped so that the linkage is not driven by the piston during steps 1 and 2. During the third step, rod 36 drives link 62 and extends shoe 60. Extension can only take place once the missile has been unlocked and released. The piston further travels until the shoe 60 has moved throughout its predetermined stroke. Flow restriction means, such as sonic throats, may be provided in the pipe conveying gas to the actuating cylinder to adjust the speed of the shoe and so the pitching speed imparted to the missile.

Referring to FIGS. 1A and 1B, the device may include an additional ball locking system 80, which may be similar to that shown in FIG. 3 and which need not be described again. This locking system prevents untimely movement of the shoe before ejection. The device makes it possible to adjust the pitching speed imparted to the missile accurately over the whole ejection range and consequently ignition of the propellent system and initiation of steering may be somewhat delayed. The device is of moderate size. Operational reliability is practically complete. The missile may be readily mounted and dismounted. Finally, if a compressed gas bottle is used (nitrogen for example) rather than a powder cartridge for providing pressurized gas, the system remains clean and maintenance is reduced, since it is limited to replacement of a gas bottle or cylinder.

The embodiment of the invention shown in FIG. 4 differs from the preceding one by the fact that it uses an unlocking cylinder and a separate ejection cylinder; the ejection cylinder is located transversely to the direction of movement of the shoe. For greater simplicity, the elements of the device of FIG. 4 which correspond to those already described are designated by the same reference number with the letter "a" affixed thereto and will not be described again.

The single actuating cylinder of the device of FIGS. 1A and 1B is replaced, in FIG. 3, by a cylinder 82 for unlocking the missile and releasing it and a main ejection cylinder 84, placed vertically. Safety is not provided by mechanical means, but by pneumatic means preventing cylinder 84 from being energized until after actuation of the unlocking cylinder 82.

The unlocking cylinder 82, shown in detail in FIG. 5, comprises a casing or body slidably receiving a hollow piston 88. The piston accomodates a valve closure member 90 biased toward its seat by a return spring 92. Valve 90 separates an intake space which communicates with a gas inlet into the casing and an annular space which, when the piston has moved over a given length from its rest position, communicates, through an opening in the piston, with a duct for gas delivery to the cylinder 84. Valve closure member 90 has a rod which projects rightwards out of the piston.

Operation of the cylinder during the first two actuation steps is immediately apparent: the high gas pressure on an effective small area of action of piston 88 moves the piston rightwards and successively causes unlocking of the missile and release thereof by pulling it forwards. At the end of the first two steps, the rod of valve 90 comes into abutment with an adjustable stop 94. Valve 90 opens and compresses spring 92. The high pressure gas is then admitted into the pipe 91 feeding the ejection cylinder. A pressurized gas intake 95 provides resetting of the piston after ejection.

As shown in FIG. 6, the ejection cylinder 84 is of the two stage telescopic type. The order in which the successive elements are actuated is imposed mechanically so as to meter the ejection force. The cylinder comprises a central tube formed with lateral and end gas flow orifices. An inner piston 96 having a small action surface, placed inside a double sleeve 98, is slidably received on the tube. Operation takes place as follows: when gas from pipe 91 enters the central tube 95, it exerts a propulsion force over the whole cross-sectional area of piston 96. Sleeve 98 is retained in its higher position by the counter pressure exerted on it. A conical valve formed by the end of pipe 91 and a slanting end face 100 of the central tube is maintained in closed condition by a return spring 102.

Piston 96 travels along its full stroke downwardly. When it comes into abutment against sleeve 98, it exerts thereon a downwardly directed force. At the same time, balls 104 locking the central tube on the sleeve come into a position confronting a recess 105 and are forced radially to lock the piston 96 on the sleeve. The assembly consisting of the piston 96 and sleeve 98 continues its downward movement until the inner part of the sleeve abuts a lower nut 106 on the inner tube. From this moment, the sleeve drives the inner tube 95 downwards. The valve opens and allows the gas to exert a pressure force on the whole cross-sectional area of the sleeve. The assembly formed by the piston and the sleeve then travels down until the actuator is fully extended.

As compared with FIGS. 1A and 1B, the arrangement of FIGS. 4–6 has the advantage of being more compact and of providing a better distribution of the push force during ejection, since the pressure drop during ejection since the pressure drop during ejection is compensated for by an increase in the effective area of action of the pressure.

We claim:

1. A missile launcher for use on an aircraft, comprising: a supporting structure arranged for being secured to the framework of an aircraft; connecting means for releasably securing a missile of elongated shape along a predetermined direction on said structure; a bearing shoe shaped to contact said missile over a sufficient length along said direction for maintaining said missile in a predetermined position with respect to said shoe; a plurality of links pivotally connected to said shoe and to said structure by pivotal connections, which pivotal connections are distributed at points so selected that said links, said supporting structure and said bearing shoe behave like a deformable quadrilateral; and fluid pressure actuated means for successively releasing said connecting means and actuating said links in a direction causing the shoe to push the missile away from said structure upon energization of said pressure actuated means.

2. A missile launcher according to claim 1, wherein said quadrilateral is substantially a parallelogram.

3. A missile launcher according to claim 1, wherein one at least of the pivotal connections of said links with said structure comprises support means pivotally supporting one of said links and provided with means for mechanically connecting it to said structure in an adjustable position.

4. A missile launcher for use on an aircraft, comprising:
   a supporting structure;
   a connecting means for releasably securing a missile of elongated shape along a predetermined direction on said structure;
   a bearing shoe shaped to contact said missile over a sufficient length along said direction for maintaining said missile in a predetermined position with respect to said shoe;
   a plurality of links pivotally connected to said shoe and to said structure by pivotal connections which pivotal connections are distributed at points so selected that said links, said supporting structure and said bearing shoe behave like a deformable parallelogram;

and fluid pressure actuated means for successively releasing said connection means and actuating said links in a direction causing said shoe to push the missile away from said structure upon energization of said pressure actuated means, wherein said connecting means comprise a rail on said structure arranged to slidably receive fittings of said missile, whereby said missile may be engaged onto said rail by moving the missile forwardly, and locking means for engaging one of the fittings upon the forward movement of the missile and latching the missile in position, and wherein said fluid pressure actuated means includes a pressure cylinder operatively connected to one at least of said links and to said locking means for moving said locking means and fitting forwardly out of said rail upon energization thereof.

5. A missile launcher according to claim 1, wherein said cylinder has a casing connected to said structure and a piston unit movable with respect to said cylinder over a predetermined rectilinear stroke and said piston unit has a one-way connection with said locking means to cause missile release during a first portion of said stroke and has a lost motion connection with said one of said links to cause ejection of said missile by said shoe during a second portion of said stroke.

6. A missile launcher according to claim 1, wherein said fluid pressure actuated means comprise: a first gas pressure cylinder for releasing said connecting means; and a second gas pressure cylinder for actuating said links, said first pressure cylinder being connectable to a pressurized gas source, said first and second gas pressure cylinders being connected by gas transfer means including a valve arranged to be opened responsive to full actuation of said first gas pressure cylinder whereby the second cylinder is energized only after the first cylinder has completed release of said missile.

* * * * *